(12) United States Patent
Murakawa

(10) Patent No.: US 7,155,051 B2
(45) Date of Patent: Dec. 26, 2006

(54) IMAGE RECOGNITION APPARATUS, IMAGE RECOGNITION METHOD AND IMAGE RECOGNITION PROGRAM FOR SPECIFIC PATTERN

(75) Inventor: Akira Murakawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 633 days.

(21) Appl. No.: 10/151,165

(22) Filed: May 21, 2002

(65) Prior Publication Data
US 2002/0176616 A1 Nov. 28, 2002

(30) Foreign Application Priority Data
May 24, 2001 (JP) ............... 2001-155596

(51) Int. Cl.
G06K 9/00 (2006.01)
G06K 9/68 (2006.01)
G06K 9/64 (2006.01)

(52) U.S. Cl. .............. 382/135; 382/218; 382/278

(58) Field of Classification Search ........... 382/287, 382/278, 291, 296, 131, 132, 135, 144–145
See application file for complete search history.

(56) References Cited

U.S. PATENT DOCUMENTS

| | | | | |
|---|---|---|---|---|
| 5,020,111 A | * | 5/1991 | Weber | 382/211 |
| 5,390,003 A | | 2/1995 | Yamaguchi et al. | |
| 5,633,947 A | * | 5/1997 | Sibbald | 382/124 |
| 5,838,820 A | * | 11/1998 | Bergman | 382/187 |
| 5,982,915 A | * | 11/1999 | Doi et al. | 382/130 |
| 5,995,652 A | * | 11/1999 | Chiu et al. | 382/159 |
| 6,005,978 A | * | 12/1999 | Garakani | 382/218 |
| 6,241,288 B1 | * | 6/2001 | Bergenek et al. | 283/67 |
| 6,477,282 B1 | * | 11/2002 | Ohtsuki et al. | 382/266 |
| 6,529,628 B1 | * | 3/2003 | Baccar | 382/173 |
| 6,690,828 B1 | * | 2/2004 | Meyers | 382/218 |
| 6,766,058 B1 | * | 7/2004 | Wilson | 382/217 |
| 6,813,392 B1 | * | 11/2004 | Kawabata | 382/294 |
| 2002/0006220 A1 | * | 1/2002 | Kohchi | 382/165 |
| 2002/0057383 A1 | * | 5/2002 | Iwamura | 348/734 |
| 2002/0164065 A1 | * | 11/2002 | Cai et al. | 382/149 |

FOREIGN PATENT DOCUMENTS

JP 11053539 2/1999

* cited by examiner

Primary Examiner—Bhavesh M. Mehta
Assistant Examiner—Utpal Shah
(74) Attorney, Agent, or Firm—Buchanan Ingersoll & Rooney PC

(57) ABSTRACT

In the image recognition processing, input color image data is analyzed, and a specific pattern contained in the graphics of the bill, security or the like is detected. The color image data is binarized with regard to specific colors. In order to detect the specific pattern from the binary image, a filter is sequentially moved to scan the entirety of the binarized image data. The examination target image within the filter is subjected to linear conversion (without changing the size thereof) at each examination position, and the degree of correlation between the pre-linear conversion image and the post-linear conversion image are calculated. It is then determined based on the calculated degree of similarity (i.e., the degree of matching) whether or not the specific pattern is included in the examination target image.

15 Claims, 9 Drawing Sheets

Fig.6(a) examination target image
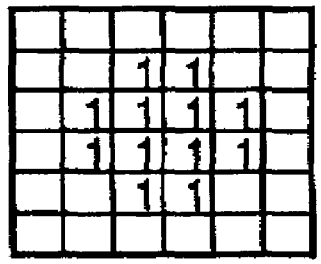
Fig.6(b) 90° rotated image    comparison result: (1: matching pixel)
36/36
Fig.6(c) 180° rotated image    comparison result: (1: matching pixel)
36/36
Fig.6(d) reference image of simple pattern matching    comparison result: (1: matching pixel)
36/36

Fig.7(a)
examination target image
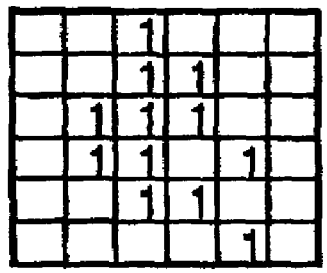
Fig.7(b) 90° rotated image
comparison result:
(1: matching pixel)
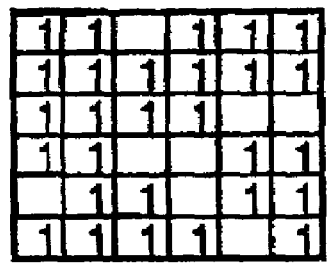
28/36
Fig.7(c) 180° rotated image
comparison result:
(1: matching pixel)
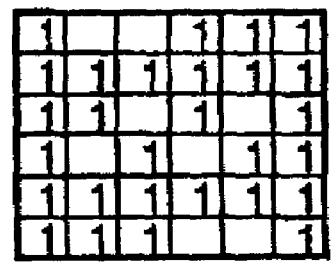
28/36
Fig.7(d) reference image of simple pattern matching
comparison result:
(1: matching pixel)
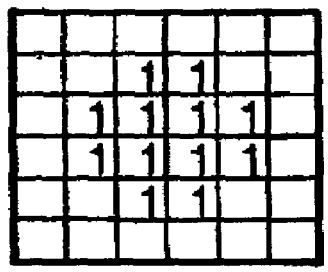 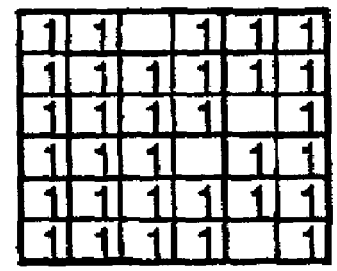
32/36

Fig.8(a)
examination target image
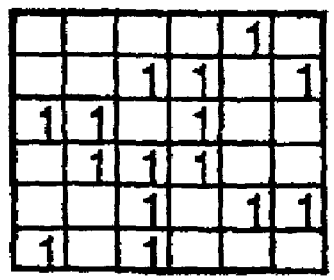
Fig.8(b)
90° rotated image
comparison result:
(1: matching pixel)
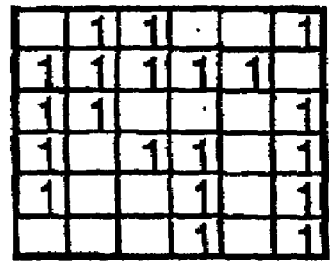
20/36
Fig.8(c)
180° rotated image
comparison result:
(1: matching pixel)
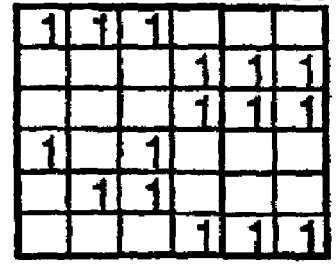
16/36
Fig.8(d)
reference image of simple pattern matching
comparison result:
(1: matching pixel)
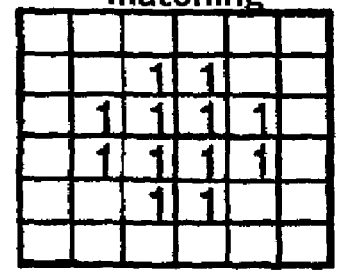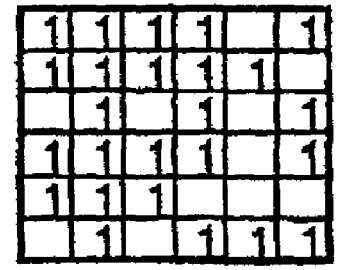
25/36

IMAGE RECOGNITION APPARATUS, IMAGE RECOGNITION METHOD AND IMAGE RECOGNITION PROGRAM FOR SPECIFIC PATTERN

CROSS-REFERENCE TO RELATED APPLICATIONS

This application is based on application No. 2001-155596 filed in Japan, the contents of which is hereby incorporated by reference.

BACKGROUND OF THE INVENTION

1. Field of the Invention

The present invention relates to an image recognition technology to detect a specific pattern in the image.

2. Description of the Related Art

Color copying machines have been improved in both function and performance in recent years. Against this backdrop, methods to prevent counterfeiting of bills and securities are being studied on an ongoing basis. One of such methods includes the following procedure: A specific pattern is included in the graphics of the bill or other security, such that when the bill or other security is scanned by a color copying machine, and the image obtained via the scanning is analyzed, if the specific pattern is detected in the image, normal image formation is prohibited.

Most of the image data from input devices is color images, which contain large amounts of information, and input/output apparatuses offer increasingly faster speed and higher resolution. Nonetheless, real-time image processing is demanded for the purpose of counterfeit prevention. Therefore, a procedure for high-speed, high-precision image recognition to detect a specific pattern must be developed.

As a conventional pattern recognition method that is performed in order to detect the position of an object or to recognize the configuration thereof, a method is known in which pattern matching is performed while shifting is carried out from one pixel to another. In this pattern matching, the data for each pixel of the image incorporated into the image processing apparatus is stored in the image memory as either binary data, i.e., monochrome data, or multi-level data, and the data thus stored is checked against the data for each pixel of a reference pattern that is stored in the memory in advance on a one-to-one basis.

In this pattern matching technology, data for a reference pattern used for the recognition of the specific pattern is prepared in advance, and the data for each pixel of the image is checked against the data for each pixel of the reference pattern on a pixel-by-pixel basis. Therefore, data for a reference pattern must be prepared in advance. For example, where images of circles of different sizes are used as the specific patterns, reference patterns must be prepared that will match the number of the different sizes. Furthermore, if the program is reverse-engineered, the reference pattern is easy to find, which means such a method is not safe.

OBJECTS AND SUMMARY

An object of the present invention is to provide a new apparatus and method for image recognition, and more specifically, is to provide an image recognition technology that can detect a specific pattern contained in the input image with a high precision and at a high speed. Another object of the present invention is to provide a specific pattern detection method that is safe from a security standpoint.

A first aspect is a specific pattern image recognition apparatus that includes a binary image generator that binarizes the input multi-level color image with regard to specific colors and generates a binary image, a linear conversion processor that performs linear conversion of an examination target image contained in the binary image without changing the size thereof, a degree of correlation calculator that calculates the degree of correlation between the examination target image and the linear-converted image obtained by the linear conversion processor, and a specific pattern determination unit that determines based on the degree of correlation calculated by the degree of correlation calculator whether the examination target image is the specific pattern.

A second aspect is a specific pattern image recognition method that includes a step of inputting a multi-level color image, a step of binarizing the input multi-level color image with regard to specific colors and generating a binary image, a step of performing linear conversion of an examination target image in the binary image without changing the size thereof, a step of calculating the degree of correlation between the examination target image and the linear-converted image obtained after the linear conversion, and a step of determining whether the examination target image is the specific pattern based on the calculated degree of correlation.

The third aspect is a specific pattern image recognition method including a step of inputting a multi-level color image, a step of binarizing the input multi-level color image with regard to specific colors and generating a binary image, a step of performing linear conversion of an examination target image in the binary image without changing the size thereof, a step of comparing the examination target image and the post-linear conversion image, and a step of determining whether or not the examination target image is the specific pattern based on the comparison result.

The fourth aspect is a computer program that causes the computer to carry out specific pattern image recognition, which includes a step of inputting a multi-level color image, a step of binarizing the input multi-level color image with regard to specific colors and generating a binary image, a step of performing linear conversion of an examination target image in the binary image without changing the size thereof, a step of calculating a degree of correlation between the examination target image and the linear-converted image obtained after the linear conversion, and a step of determining based on the calculated degree of correlation whether or not the examination target image is the specific pattern.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 6 is a drawing to explain one example of self-correlation via rotation with regard to a specific circular pattern;

FIG. 7 is a drawing to explain another example of self-correlation via rotation with regard to a specific circular pattern;

FIG. 8 is a drawing to explain yet another example of self-correlation via rotation with regard to a specific circular pattern;

In the following description, like parts are designated by like reference numbers throughout the several drawings.

DESCRIPTION OF THE PREFERRED EMBODIMENTS

Figure 1:
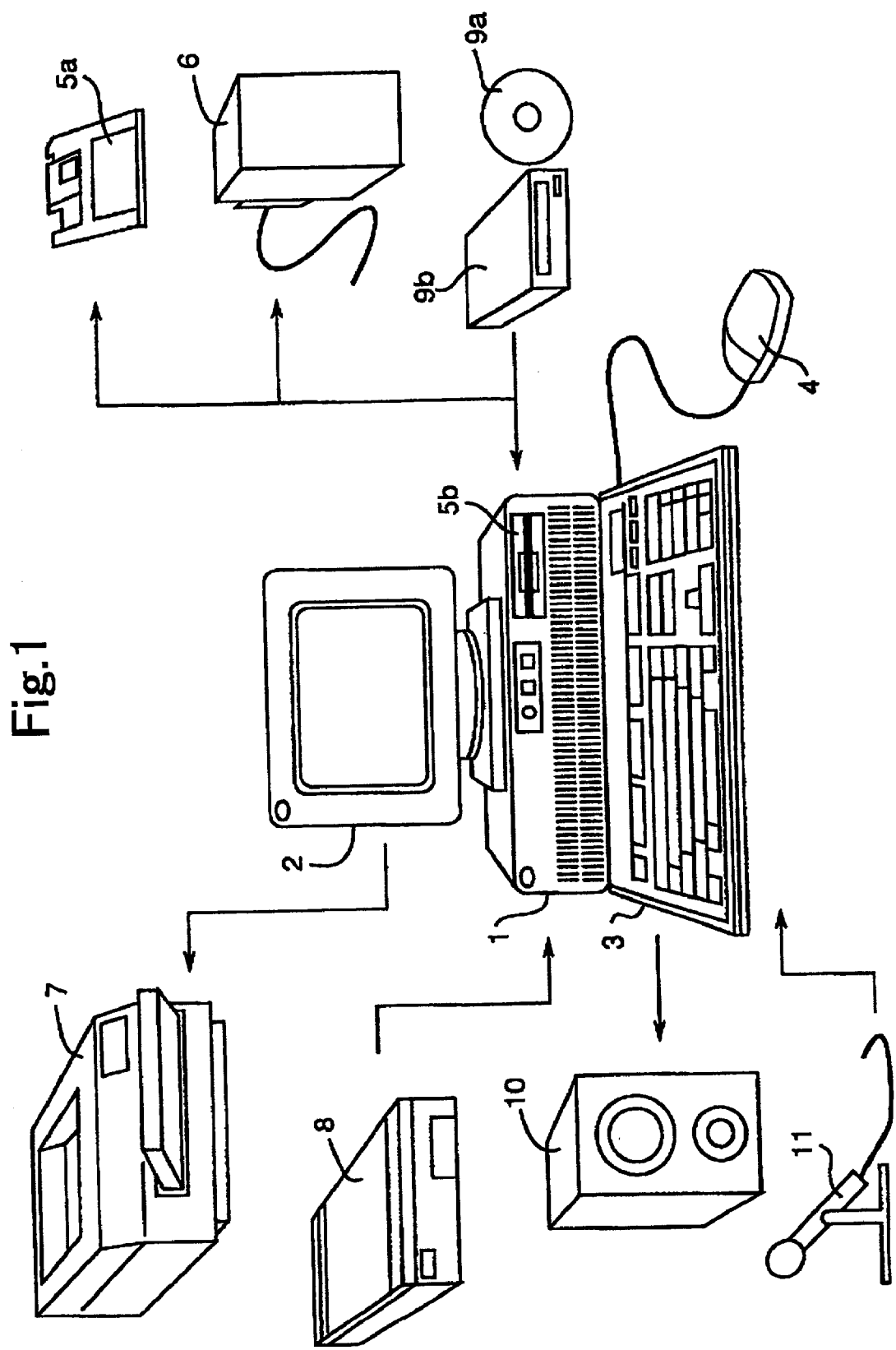
FIG. 1 is a drawing showing the overall construction of an image processing system.

An embodiment of the present invention will be described below with reference to the accompanying drawings. In the drawings, identical reference numbers refer to the same or equivalent components.

FIG. 1 is a basic perspective view that shows the construction of an image processing system employing degree of self-rotational correlation pertaining to this embodiment. It detects a specific pattern based on self-rotational correlation via rotation. In other words, a specific pattern is detected based on the correlation (similarity) between the original image and the image obtained by rotating the original image. This image processing system comprises a CPU and other components, i.e., a controller 1 that controls the entire system, a display 2 that displays images, letters or the like, and performs various types of display for operation purposes, a keyboard 3 and mouse 4 to carry out various types of input and instruction operations, a floppy disk 5 and hard disk 6 that comprise data recording media, a printer 7 to output image data, a scanner 8 and CD-ROM device 9 to incorporate image data, and a speaker 10 and microphone 11 for sound output and input.

Figure 2:
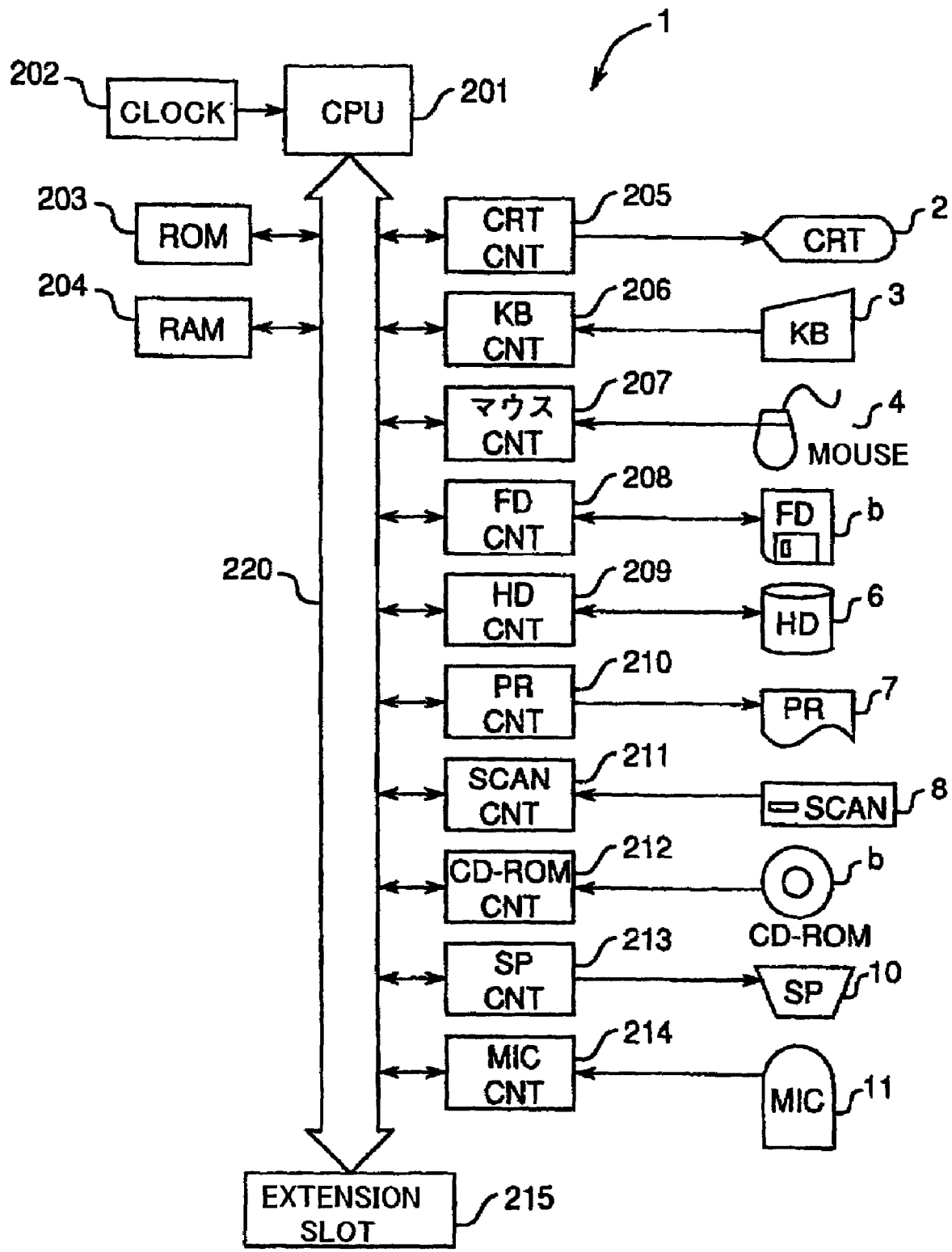
FIG. 2 is a block diagram of a control system comprising a controller and other components.

FIG. 2 is a block diagram of the image processing system control system, which comprises the controller 1 and other components. The controller 1 comprises a CPU 201 and other components, and connected to the CPU 201 via a data bus 220, which is connected to the CPU 201, are a ROM 203 that stores the program that controls this system and other information, a RAM 204 that stores data and programs, a display control circuit 205 that causes images, letters or the like to be displayed on the display 2, a keyboard control circuit 206 that performs forwarding control regarding the input from the keyboard 5, a mouse control circuit 207 that performs forwarding control regarding the input from the mouse 4, a floppy disk control circuit 208 that controls the floppy disk 5, a hard disk control circuit 209 that controls the hard disk 6, a printer control circuit 210 that controls the output to the printer 7, a scanner control circuit 211 that controls the scanner 8, a CD-ROM device control circuit 212 that controls the CD-ROM device 9, a speaker control circuit 213 that controls the speaker 10, and a microphone control circuit 214 that controls the microphone 11. A clock 202 that generates reference clocks necessary to cause this system to operate is connected to the CPU 201 as well. Furthermore, an extension slot 215 to connect various extension boards is also connected to the CPU 201 via the data bus 220. In this embodiment, the program that controls the system is stored in the ROM 203, but the program pertaining to the present invention may be read in from a different device such as a personal computer and then executed.

Figure 3:
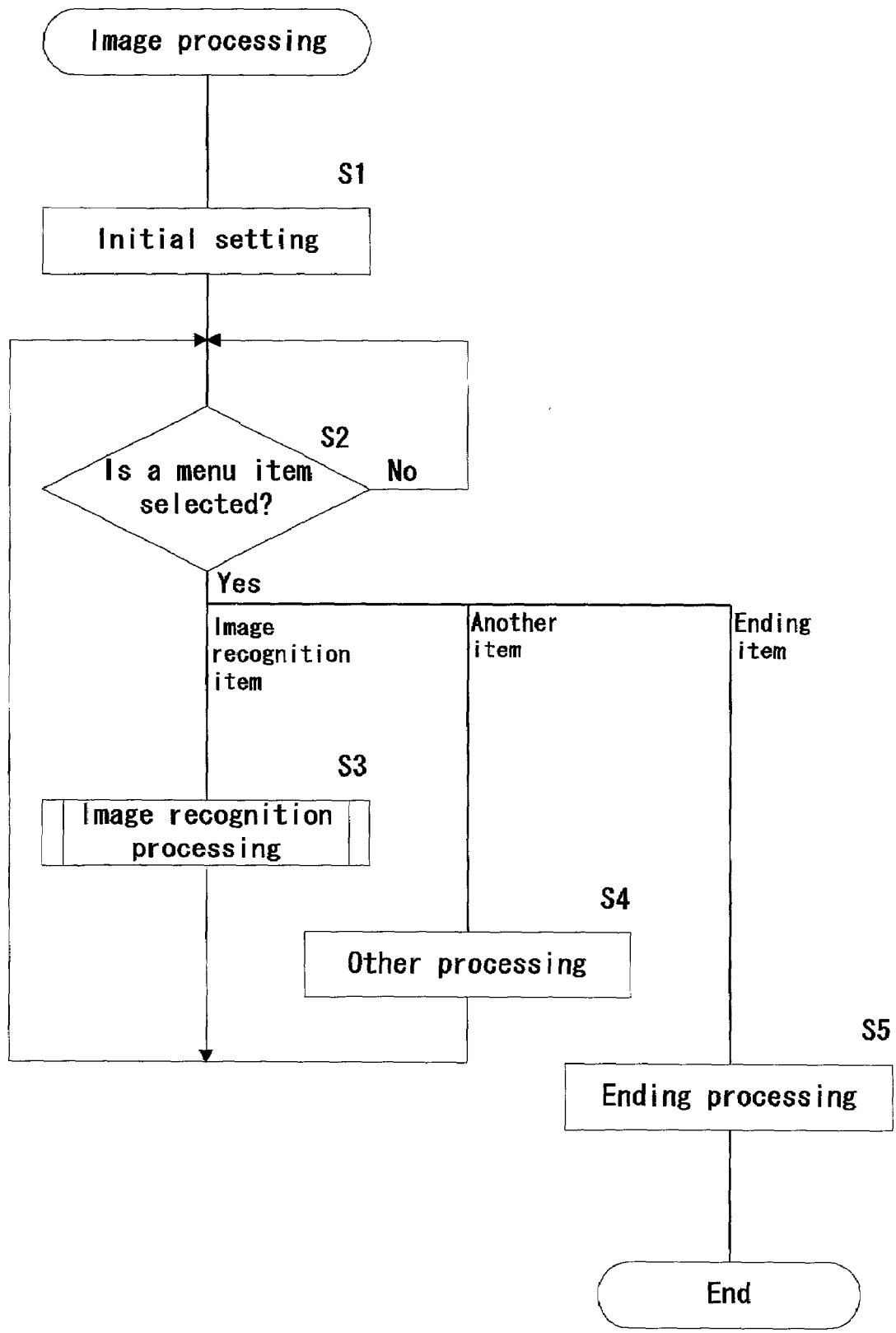
FIG. 3 is a flow chart of an image processing routine.

FIG. 3 is a flow chart showing the main routine of the image processing performed by the controller 1 of the image processing system described above. When the program is booted, necessary flags are initialized and the initial screen is displayed in the subsequent step (S1). It is then determined whether or not a menu item has been selected in the screen (S2). If it has, processing for image recognition (S3), another menu item (S4) or ending (S5) is carried out in response to the selection. If no menu item has been selected, the processing of step S2 is repeated without any other processing. The details of the processing for image recognition of step S3 will be described in detail below. Because other steps do not have a direct bearing on the present invention, they will not be explained here.

Figure 4:
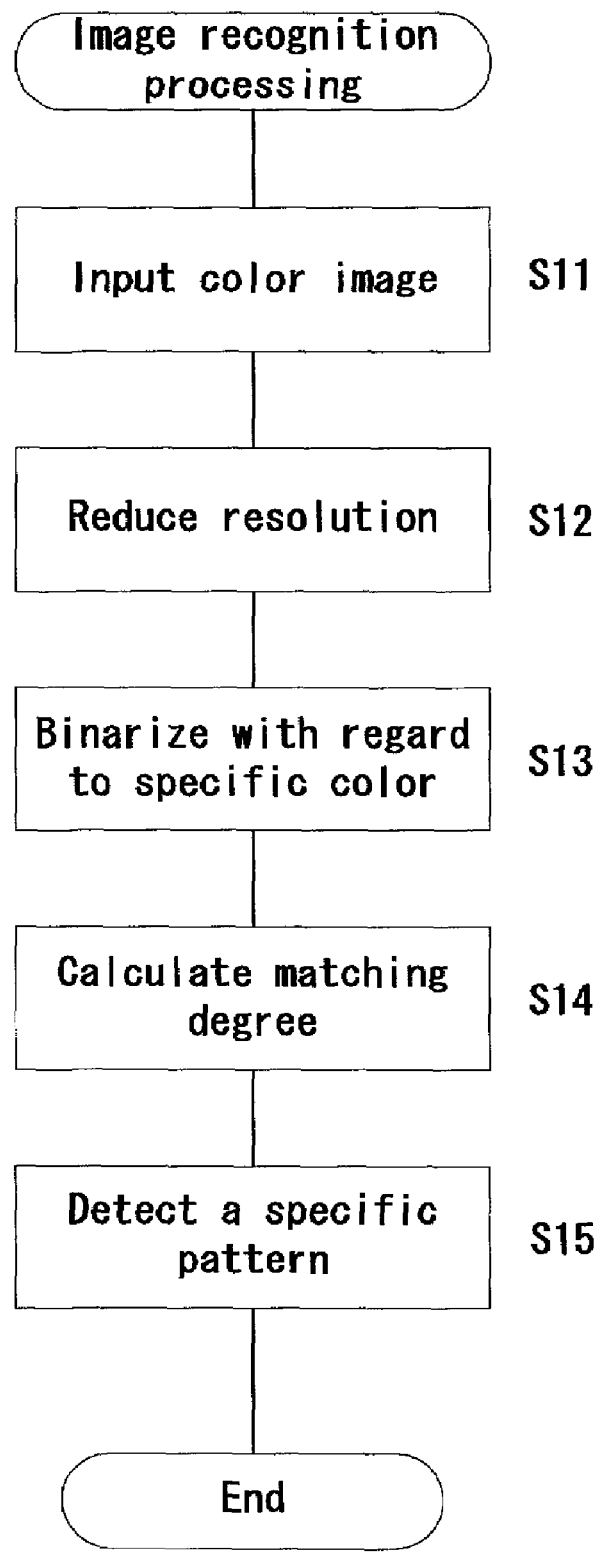
FIG. 4 is a flow chart of an image recognition routine.

FIG. 4 is a subroutine showing the sequence of the image recognition processing (S3 of FIG. 3). In this image recognition routine, the input image data such as image data obtained through scanning of [the original] by the scanner 8 is analyzed, and a specific pattern contained in the graphics of the bill, security or the like is detected. A specific pattern is a pattern having a prescribed configuration (such as a circular configuration) and a prescribed size. It is also a pattern of a specific color. First, the color image data for the recognition object, i.e. the object to undergo recognition processing, is input (S11). In the case of this system, color image data for the recognition object is the input. This color image data may be color image data that is obtained by reading a bill, security or the like using the scanner 8, or color image data that is stored in the hard disk 6 or other components in advance. Next, in order to speed up the processing, the resolution of the image data for the recognition object is reduced to a low resolution (image fineness) that would still allow image recognition (S12) Because resolution conversion is a public domain technology, it will not be explained in detail herein. The color image data is then binarized with regard to specific colors (S13) Here, if the value of each color component, i.e., R, G and B, of each pixel of the image data falls within a designated range, the bit for that pixel is set to ON, and if any of the color components fall outside that range, the bit is set to OFF. For example, if the conditions shown below (ranges for specific colors) are met, the bit for that pixel is set to ON.

RedMin≦Red≦RedMax

GreenMin≦Green≦GreenMax

BlueMin≦Blue≦BlueMax

Here, Red, Green and Blue stand for the pixel values for the R, G and B components of the subject pixel. RedMax, GreenMax and BlueMax are the maximum values and RedMin, GreenMin and BlueMin are the minimum values for the R, G and B components, respectively.

Figure 5:
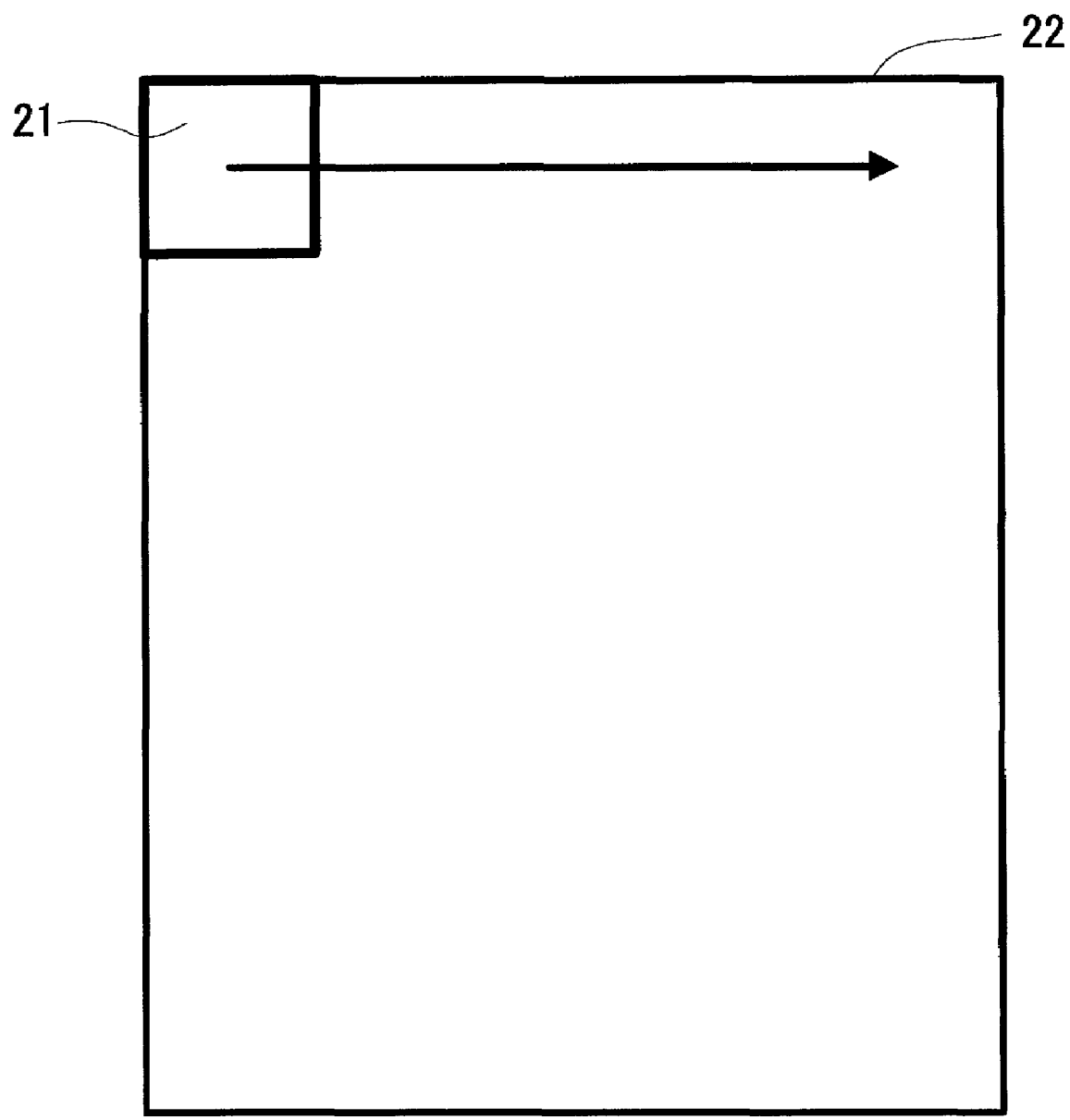
FIG. 5 is a drawing showing the entire image data being scanned by a filter.

Next, in order to detect a specific pattern from the binary image, as shown in FIG. 5, the filter is sequentially moved to scan the entirety of the binarized image data. The size of the filter is determined in response to the size of the specific pattern. In this embodiment, the image 22 is scanned starting from the left top corner thereof using a filter 21 the size of 6×6 pixels. When this is done, each time the filter is moved, the examination target image within the filter is subjected to linear conversion (without changing the size thereof) at each examination position, and the degree of correlation between the pre-linear conversion image and the post-linear conversion image are calculated (S14). Because a specific circular pattern is to be detected in this embodiment, rotation is used as the linear conversion. Rotation of the image is carried out as linear conversion based on matrix calculation, for example. The degree of similarity (self-correlation via rotation) is then sought as the degree of correlation between the image at the examination position and the rotated image thereof.

It is then determined based on the calculated degree of similarity (i.e., the degree of matching) whether or not the specific pattern, i.e., the pattern sought in the examination, is included in the examination target image at the examination position (S15). Where the specific pattern comprises a circle, the shape thereof should not change when rotated, and therefore the degree of similarity between the original image and the rotated image should also stay constant. Therefore, detection for the specific pattern is carried out while taking into consideration changes in the degree of similarity that may occur due to rotation. For example, even if the degree of similarity is high when the image is rotated by a certain degree, if the change in the degree of similarity after rotation is large, it is determined that the specific pattern comprising a circle, which is the object of detection, does not exist. When scanning is completed regarding the entire binary image data, the image recognition routine is ended.

FIGS. 6 though 8 sequentially show the results of comparison based on self-correlation via rotation (i.e., the results of similarity calculation) in accordance with this embodiment and the results of comparison based on conventional simple pattern matching in which a reference pattern is used, wherein the specific pattern comprises a circle. As can be seen from the description below, self-correlation via rotation can more accurately distinguish misalignment from the specific pattern.

FIG. 6 shows a first example of the examination target image. First, the examination target image of the reduced-resolution image at the examination position is input. FIG. 6(a) shows the 6×6 pixel examination target image. In this example, a pattern comprising a circle is extracted with good symmetricity. The degree of similarity, i.e., the degree of self-correlation via rotation, is then calculated. In the case of the 90° rotated image shown in FIG. 6(b), a comparison of the examination target image and the 90° rotated image thereof reveals that the number of matching pixels is 36. Therefore, the degree of similarity is 36/36. In the case of the 180° rotated image shown in FIG. 6(c), a comparison between the examination target image and the 180° rotated image thereof reveals that the number of matching pixels is 36. Therefore, the degree of similarity is 36/36. In the conventional simple pattern matching using a reference image, the number of matching pixels is 36 shown in FIG. 6(d), which translates into a high degree of similarity, i.e., 36/36. As described above, where the examination target image was extracted without deterioration, the comparisons resulted in the same degree of similarity.

FIG. 7 shows a second example of the examination target image. First, the examination target image of the reduced-resolution image at the examination position is input. FIG. 7(a) shows the 6×6 pixel examination target image. In this example, the pattern contained in the examination target image is extracted with slight deterioration from being a perfect circle. The degree of similarity, which is the self-correlation via rotation, is then calculated. In the case of the 90° rotated image of the examination target image shown in FIG. 7(b), comparison between the examination target image and the 90° rotated image thereof results in 28 matching pixels. Therefore, the degree of similarity is 28/36. In the case of the 180° rotated image, because comparison between the examination target image and the 180° rotated image thereof results in 28 matching pixels, the degree of similarity is 28/36. In contrast, in the conventional simple pattern matching using a reference image, the number of matching pixels was 32, which translates into a high degree of similarity, i.e., 32/36. As described above, in comparison with the conventional simple pattern matching, the degree of similarity is lower for both the 90° rotated image and the 180° rotated image. In other words, it can be seen that the degree of self-correlation via rotation is sensitive to changes in the specific pattern configuration during comparison with the specific pattern.

FIG. 8 further shows a third example of the examination target image. First, the examination target image of the reduced-resolution image at the examination position is input. FIG. 8(a) shows the 6×6 pixel examination target image. In this example, the pattern contained in the examination target image is quite different from a circular pattern. The degree of similarity, which is the self-correlation via rotation, is then calculated. In the case of the 90° rotated image of the examination target image shown in FIG. 8(b), comparison between the examination target image and the 90° rotated image thereof results in 20 matching pixels. Therefore, the degree of similarity is 20/36. In the case of the 180° rotated image, because comparison between the examination target image and the 180° rotated image thereof results in 16 matching pixels, the degree of similarity is 16/36. As described above, the degree of similarity is low for the comparison with both the 90° rotated image and the 180° rotated image. Therefore, it can be determined that the detected pattern is not the specific pattern. On the other hand, where the conventional simple pattern matching was used, the number of pixels that matched with the reference image was 25, which translates into a high degree of similarity, i.e., 25/36. Therefore, in comparison with the conventional simple pattern matching approach, this embodiment can perform more accurate determination with regard to at least the sample image (a), and is effective for the examination of a circular pattern.

It was seen, as described above, that the degree of similarity based on self-correlation is effective for the examination of a circular pattern. By seeking the degree of self-correlation (degree of similarity) via rotation and comparing the result with an appropriate threshold value, it may be determined whether or not the examination target image is a specific pattern. In the case of examination for a circular pattern, any rotational angle may be used, such as 90° or 180°.

Figure 9:
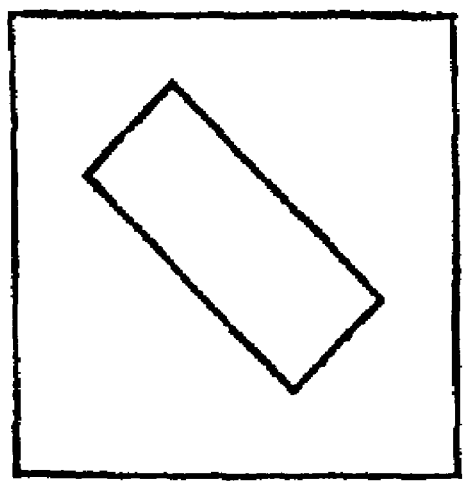
FIG. 9 is a drawing to explain one example of self-correlation via rotation with regard to a specific pattern that has a different type of symmetricity.
Figure 10:
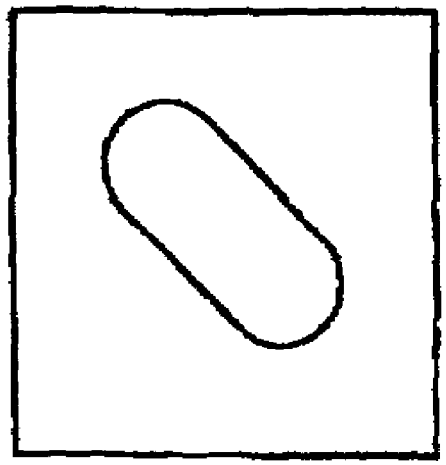
FIG. 10 is a drawing to explain one example of self-correlation via rotation with regard to yet another specific pattern that has a different type of symmetricity.

The description provided above concerned a case in which the configuration of the specific pattern is a circle. A specific pattern may also be detected where the configuration thereof is other than circular, by performing linear conversion suited to the symmetricity of the specific pattern and seeking the degree of self-correlation. For example, FIG. 9 shows an example of a rectangular specific pattern, and FIG. 10 shows an example of a capsule-shaped specific pattern. In the case of such specific patterns, self-correlation between the original image and the 180° rotated image thereof should be calculated. In the case of a diagonally symmetrical pattern, comparison should be made relative to at least one of the 90°, 180° and 270° rotated images. Similarly, where the specific pattern is a line-symmetrical pattern, the degree of self-correlation should be sought based on line-symmetrical conversion of the examination target image.

As described above, according to this embodiment, a specific pattern can be recognized more accurately than with simple pattern matching.

In addition, this embodiment can accommodate a specific pattern of any size. In other words, because this method does not depend on the diameter of the circle, it is not necessary to take into consideration the size of the specific pattern.

Furthermore, because the determination of whether or not the examination target image has the target configuration is based on the degree of self-correlation thereof, a reference pattern, which is needed for regular pattern matching at all times, is not necessary. Therefore, resources (such as a memory) to store the reference pattern are not required. In addition, because no reference pattern exists, even if the program is reverse-engineered, no specific reference pattern can be found, which improves security.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A specific pattern image recognition apparatus comprising:
    a binary image generator which binarizes input multi-level color image with regard to specific colors and generates a binary image;
    a linear conversion processor which performs linear conversion of an examination target image contained in the binary image without changing the size thereof;
    a degree of correlation calculator which compares the examination target image with the linear-converted image and calculates a degree of correlation between the examination target image and the linear-converted image obtained by the linear conversion processor; and
    a specific pattern determination unit that determines, based on the degree of correlation calculated from the comparison of the examination target image with the linear-converted image, whether the examination target image is a specific pattern.

2. A specific pattern image recognition apparatus as claimed in claim 1, further comprising:
    an examination target image setter that specifies the examination target image in the binary image by moving a filter of a prescribed size.

3. A specific pattern image recognition apparatus as claimed in claim 1, further comprising:
    a resolution converter that converts the input multi-level color image into a low-resolution multi-level color image,
    wherein said binary image generator binarizes the low-resolution multi-level color image obtained via the conversion by the resolution converter.

4. A specific pattern image recognition apparatus as claimed in claim 1,
    wherein said linear conversion performed by the linear conversion processor comprises 180° rotation.

5. A specific pattern image recognition apparatus as claimed in claim 1,
    wherein said linear conversion performed by the linear conversion processor comprises line-symmetry conversion.

6. A specific pattern image recognition method comprising the steps of:
    inputting a multi-level color image;
    binarizing the input multi-level color image with regard to specific colors and generating a binary image;
    performing linear conversion of an examination target image in the binary image without changing the size thereof;
    comparing the examination target with the linear-converted image of the examination target;
    calculating a degree of correlation between the examination target image and the linear-converted image obtained after the linear conversion based on said comparison; and
    determining whether the examination target image is the specific pattern based on the calculated degree of correlation calculated from the comparison of the the examination target image with the linear-converted image.

7. A specific pattern image recognition method as claimed in claim 6, further comprising the step of:
    setting the examination target image in the binary image by moving a filter of a prescribed size.

8. A specific pattern image recognition method as claimed in claim 6, further comprising the step of:
    converting the input multi-level color image into a low-resolution multi-level color image,
    wherein the step of generating a binary image binarizes the low-resolution multi-level color image obtained via the resolution conversion.

9. A specific pattern image recognition method as claimed in claim 6,
    wherein said linear conversion comprises 180° image rotation.

10. A specific pattern image recognition method as claimed in claim 6,
    wherein said linear conversion comprises line-symmetry conversion.

11. A specific pattern image recognition method comprising the steps of:
    inputting a multi-level color image;
    binarizing the input multi-level color image with regard to specific colors without changing the size thereof;
    performing linear conversion of an examination target image in the binary image without changing the size thereof;
    comparing the examination target image and the post-linear conversion image; and
    determining whether or not the examination target image is the specific pattern based on the comparison result.

12. A computer program recorded on a computer recordable medium that causes the computer to carry out specific pattern image recognition, the program comprising the steps of:
    inputting a multi-level color image;
    binarizing the input multi-level color image with regard to specific colors and generating a binary image;
    performing linear conversion of an examination target image in the binary image without changing the size thereof;
    comparing the examination target image and the linear-converted image obtained after the linear conversion;
    calculating a degree of correlation between the examination target image and the linear-converted image obtained after the linear conversion; and
    determining based on the calculated degree of correlation whether or not the examination target image is the specific pattern calculated from the comparison of the examination target image with the linear-converted image.

13. A computer program recorded on a computer recordable medium as claimed in claim 12, further comprising the step of:

setting the examination target image in the binary image by moving a filter of a prescribed size.

14. A computer program recorded on a computer recordable medium as claimed in claim 12, further comprising the step of:

converting the input multi-level color image into a low-resolution multi-level color image, wherein the step of generating a binary image binarizes the low-resolution multi-level color image obtained via the resolution conversion.

15. A computer-readable recording medium recording the program as claimed in claim 12.

* * * * *